US009608980B2

(12) United States Patent
Caffary, Jr.

(10) Patent No.: US 9,608,980 B2
(45) Date of Patent: Mar. 28, 2017

(54) ENVIRONMENT-AWARE SECURITY TOKENS

(71) Applicant: Document Dynamics, LLC, Jewett City, CT (US)

(72) Inventor: Robert G. Caffary, Jr., Jewett City, CT (US)

(73) Assignee: Document Dynamics, LLC, Jewett City, CT (US)

( * ) Notice: Subject to any disclaimer, the term of this patent is extended or adjusted under 35 U.S.C. 154(b) by 0 days.

(21) Appl. No.: 15/236,628

(22) Filed: Aug. 15, 2016

(65) Prior Publication Data

US 2016/0352741 A1 Dec. 1, 2016

Related U.S. Application Data

(63) Continuation of application No. 14/456,777, filed on Aug. 11, 2014, now Pat. No. 9,449,187.

(51) Int. Cl.
*H04L 29/06* (2006.01)
*H04L 9/30* (2006.01)
*H04L 9/14* (2006.01)
*G06F 21/62* (2013.01)
(Continued)

(52) U.S. Cl.
CPC .......... *H04L 63/08* (2013.01); *G06F 21/6218* (2013.01); *H04L 9/14* (2013.01); *H04L 9/30* (2013.01); *H04L 63/06* (2013.01); *H04L 63/0807* (2013.01); *H04L 63/10* (2013.01); *H04L 63/102* (2013.01); *H04L 63/20* (2013.01); *G06F 2221/2143* (2013.01);
(Continued)

(58) Field of Classification Search
CPC ......... H04L 63/08; H04L 63/20; H04L 63/10; H04L 63/06; H04L 63/102; H04L 63/0807; H04L 63/0815; H04L 9/006; H04L 9/30; H04L 9/14; H04L 2209/56; H04L 67/306; G06F 21/6218; G06F 2221/2143
See application file for complete search history.

(56) References Cited

U.S. PATENT DOCUMENTS

| 6,145,003 | A  | 11/2000 | Sanu |
| 6,397,261 | B1 | 5/2002  | Eldridge |
| 6,487,189 | B1 | 11/2002 | Eldridge |

(Continued)

OTHER PUBLICATIONS

International Search Report and Written Opinion, PCT/US2015/044061, mailed May 19, 2016, 7 pages.

*Primary Examiner* — Darren B Schwartz
(74) *Attorney, Agent, or Firm* — Fish & Richardson P.C.

(57) ABSTRACT

The technology described in this document can be embodied in a computer implemented method that includes receiving, at a processing device, information about one or more assets associated with a network of devices. The method also includes generating, for at least one of the assets, a security token that is based at least on a portion of the received information about the corresponding asset. The security token can be configured to identify a home network defined for the asset, and to restrict access to the corresponding asset upon detecting an occurrence of an unauthorized activity involving the asset. The method further includes storing, in a storage device, information about the security token and information linking the security token to the corresponding asset, and initiating integration of the security token with the corresponding asset.

30 Claims, 5 Drawing Sheets

(51) Int. Cl.
  *H04L 9/00*  (2006.01)
  *H04L 29/08*  (2006.01)
(52) U.S. Cl.
  CPC .......... *H04L 9/006* (2013.01); *H04L 63/0815* (2013.01); *H04L 67/306* (2013.01); *H04L 2209/56* (2013.01)

(56) References Cited

U.S. PATENT DOCUMENTS

| | | | |
|---|---|---|---|
| 6,493,760 B1 | 12/2002 | Pendlebury | |
| 6,502,135 B1 | 12/2002 | Munger | |
| 6,519,700 B1* | 2/2003 | Ram | G06F 21/10 380/201 |
| 7,418,504 B2 | 8/2008 | Larson | |
| 7,490,151 B2 | 2/2009 | Munger | |
| 7,921,211 B2 | 4/2011 | Larson | |
| 8,984,651 B1 | 3/2015 | Miller | |
| 9,231,956 B1* | 1/2016 | Johnson | H04L 63/10 |
| 2002/0048369 A1* | 4/2002 | Ginter | G06F 21/10 380/277 |
| 2002/0077985 A1 | 6/2002 | Kobata | |
| 2002/0171546 A1 | 11/2002 | Evans | |
| 2003/0018491 A1* | 1/2003 | Nakahara | G06F 21/10 705/59 |
| 2003/0200436 A1 | 10/2003 | Eun | |
| 2004/0078573 A1* | 4/2004 | Matsuyama | H04L 63/0869 713/175 |
| 2004/0123153 A1 | 6/2004 | Wright | |
| 2004/0215772 A1 | 10/2004 | Sinker | |
| 2004/0255137 A1 | 12/2004 | Ying | |
| 2005/0080746 A1* | 4/2005 | Zhu | G06F 21/10 705/59 |
| 2005/0086514 A1 | 4/2005 | Han | |
| 2005/0111466 A1 | 5/2005 | Kappes | |
| 2005/0114672 A1 | 5/2005 | Duncan | |
| 2005/0235361 A1 | 10/2005 | Alkove | |
| 2006/0005132 A1 | 1/2006 | Herdeg | |
| 2006/0085738 A1 | 4/2006 | Chapus | |
| 2007/0118891 A1 | 5/2007 | Buer | |
| 2007/0156694 A1 | 7/2007 | Lim | |
| 2007/0185814 A1 | 8/2007 | Boccon | |
| 2008/0047000 A1* | 2/2008 | Kanamaru | G06F 21/10 726/17 |
| 2008/0095373 A1 | 4/2008 | Nagata | |
| 2008/0097998 A1 | 4/2008 | Herbach | |
| 2008/0103977 A1* | 5/2008 | Khosravy | G06F 21/10 705/59 |
| 2008/0255994 A1* | 10/2008 | Schnell | G06Q 30/02 705/52 |
| 2009/0089353 A1* | 4/2009 | Fukuta | G06F 15/16 709/201 |
| 2009/0183257 A1 | 7/2009 | Prahalad | |
| 2009/0240941 A1* | 9/2009 | Lee | H04L 12/66 713/169 |
| 2009/0287709 A1* | 11/2009 | Kusakabe | G06F 21/6218 |
| 2009/0327908 A1 | 12/2009 | Hayton | |
| 2010/0036950 A1* | 2/2010 | Bae | H04L 12/2812 709/225 |
| 2010/0082680 A1 | 4/2010 | Ryder | |
| 2010/0088258 A1 | 4/2010 | Oaten | |
| 2010/0138900 A1* | 6/2010 | Peterka | H04L 12/2812 726/4 |
| 2010/0153696 A1 | 6/2010 | Beachem | |
| 2010/0235514 A1 | 9/2010 | Beachem | |
| 2010/0235885 A1* | 9/2010 | Persson | G06F 21/629 726/4 |
| 2011/0314530 A1 | 12/2011 | Donaldson | |
| 2012/0102540 A1 | 4/2012 | Aronson | |
| 2012/0167158 A1* | 6/2012 | Leach | G06Q 10/06 726/1 |
| 2012/0185841 A1 | 7/2012 | Lee | |
| 2013/0061335 A1 | 3/2013 | Schwabe | |
| 2013/0212271 A1 | 8/2013 | Aronson | |
| 2013/0298253 A1 | 11/2013 | Hwang | |
| 2013/0318211 A1 | 11/2013 | Kent | |
| 2014/0075568 A1 | 3/2014 | Sathyadevan | |
| 2014/0130117 A1 | 5/2014 | Jeannot | |
| 2014/0280740 A1 | 9/2014 | Alley | |
| 2015/0101042 A1* | 4/2015 | Yang | G06F 21/6218 726/21 |
| 2015/0324602 A1 | 11/2015 | Lim | |
| 2016/0036822 A1 | 2/2016 | Kim | |

* cited by examiner

ENVIRONMENT-AWARE SECURITY TOKENS

CLAIM OF PRIORITY

This application is a continuation application and claims priority under 35 USC §120 to U.S. patent application Ser. No. 14/456,777, filed on Aug. 11, 2014, the entire contents of which are hereby incorporated by reference.

TECHNICAL FIELD

This disclosure relates to security of networked devices and files.

BACKGROUND

Security tokens for authorizing use of computer services can be generated using a security architecture such as a shared secret architecture or a public-key cryptography architecture.

SUMMARY

In one aspect, the technology described in this document can be embodied in a computer implemented method that includes receiving, at a processing device, information about one or more assets associated with a network of devices. The method also includes generating, for at least one of the assets, a security token that is based at least on a portion of the received information about the corresponding asset. The security token can be configured to identify a home network defined for the asset, and to restrict access to the corresponding asset upon detecting an occurrence of an unauthorized activity involving the asset. The method further includes storing, in a storage device, information about the security token and information linking the security token to the corresponding asset, and initiating integration of the security token with the corresponding asset.

In another aspect, the technology described in this document can be embodied in a computing device that includes memory and one or more processors. The one or more processors can be configured to receive information about one or more assets associated with a network of devices. The processors can also be configured to generate for at least one of the assets, a security token that is based at least on a portion of the received information about the corresponding asset. The security token can be configured to identify a home network defined for the asset, and also to restrict access to the corresponding asset upon detecting an occurrence of an unauthorized activity involving the asset. The processors can be further configured to store, in a storage device, information about the security token and information linking the security token to the corresponding asset, and initiate integration of the security token with the corresponding asset.

In another aspect, the technology described in this document can be embodied in one or more machine-readable storage devices that store instructions executable by one or more processing devices. These instructions, when executed, can cause the one or more processing devices to perform operations that include receiving information about one or more assets associated with a network of devices. The operations also include generating, for at least one of the assets, a security token that is based at least on a portion of the received information about the corresponding asset. The security token can be configured to identify a home network defined for the asset, and to restrict access to the corresponding asset upon detecting an occurrence of an unauthorized activity involving the asset. The operations further include storing, in a storage device, information about the security token and information linking the security token to the corresponding asset, and initiating integration of the security token with the corresponding asset.

Implementations of the above embodiments can include one or more of the following features.

Detecting the occurrence of the unauthorized activity can include determining a dissociation of the asset from the home network defined for the asset. The assets associated with the network can include one or more of: a device connected to the network, a file stored on a storage device connected to the network, and a user-profile associated with the network. The asset can be an electronic file, and initiating the integration of the security token into the asset can include initiating an encryption of the asset based on the security token. The home network for the asset can be defined based on one or more security policies associated with the asset. The information can include one or more of: a serial number of a device, a media access control (MAC) address, a file path, a registry key, a network identifier, an internet protocol (IP) address, a file-type identifier, a user-profile identifier, and one or more policies associated with the network. The information about the one or more assets can be received from an agent deployed on the network. The agent can be configured to scan the devices of the network to obtain the information. The agent can include an automated browser. The security token can include an object generated in accordance with Component Object Model (COM). The security token can be generated in accordance with one or more security policies associated with the corresponding asset. Determining the dissociation of the corresponding asset from the home network can include determining that the corresponding asset is not connected to the home network. Determining the dissociation of the corresponding asset from the home network can include determining that the corresponding asset is not stored on a device associated with the home network. Determining the dissociation of the corresponding asset from the home network can include detecting an access attempt from a user-profile not associated with the home network. The corresponding asset can be an electronic file, and the security token can be configured to restrict access to the electronic file by deleting content of the electronic file upon determining the dissociation from the home network. The information about the security token and the information linking the security token to the corresponding identifier can be stored in a database. The corresponding asset can be an electronic file, and initiating an integration of the security token into the electronic file can include initiating a code injection to a header portion of the electronic file. The corresponding asset can be an electronic file, and initiating an integration of the security token with the electronic file can include initiating an encapsulation of the security token with the electronic file. The executable file can be generated via the encapsulation. The corresponding asset can be an electronic document, and the security token can be integrated into the document as a portion of a page description language of the document. Information related to an access point attempting to access an asset can be received from the asset, based possibly on information collected by the security token. A determination can be made, based on the stored information about the security token, whether the access point is associated with the security token. Permission information indicating a level of access permitted for the access point can be provided based on the determination.

In some implementations, the technology described in this document may provide one or more of the following advantages. By using environment-aware security tokens that include an identification of an authorized network (often referred to as the home network), network assets such as one or more devices, user profiles and document files can be locked down within the authorized network. Security of data and other network assets can therefore be increased many fold. For example, even if files are fraudulently copied and stored (for example, via a security breach) on a non-authorized device (i.e., a device not authenticated to the authorized network), the environment-aware security token associated with the files can detect this dissociation from the home network and prevent unauthorized access to the files. Efficacy of malicious security breaches can therefore be mitigated by reducing usefulness of stolen data. In some implementations, physical devices such as printers, laptops, phones, mobile devices, etc. can also be associated with environment-aware security tokens such that the devices are functional only when connected to the authorized network. The environment-aware security tokens can be configured to be user-defined, scalable, and adaptive to provide a greater degree of control on accessibility of corresponding assets. For example, the environment-aware security token associated with a particular document can be configured such that the particular document is viewable only on a predefined set of computing devices within the authorized network.

Other features and advantages are apparent from the following detailed description, and from the claims.

DETAILED DESCRIPTION

Figure 1:
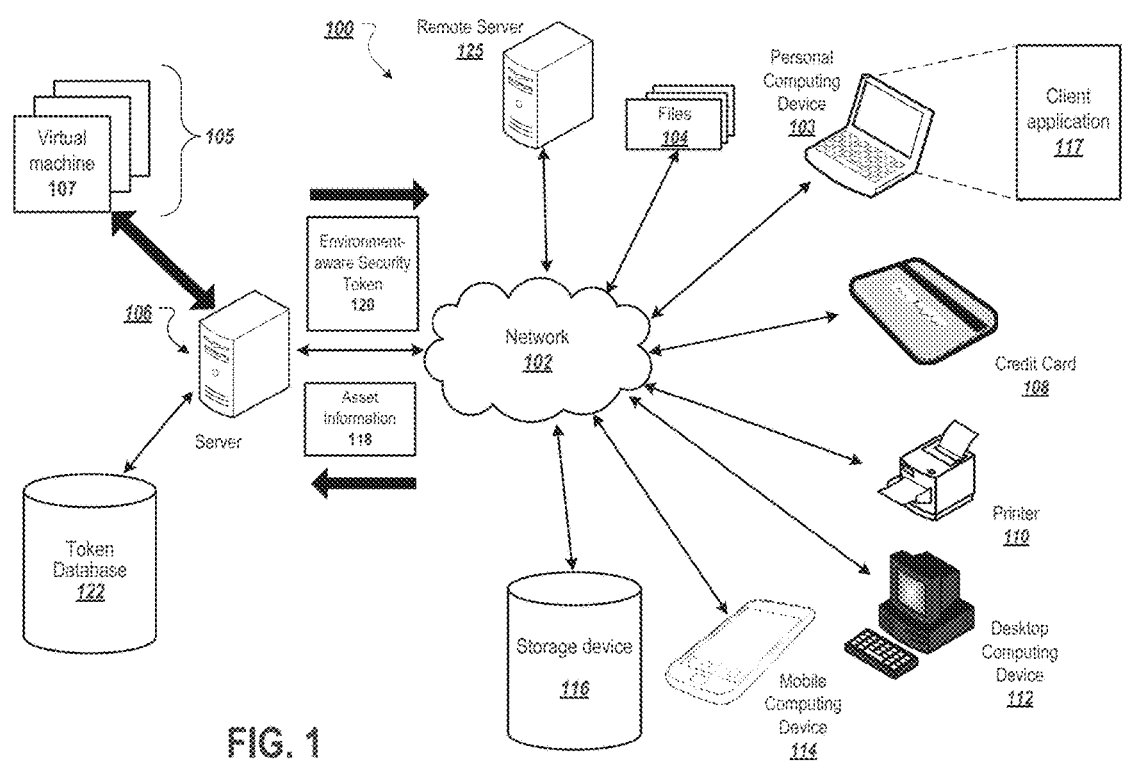
FIG. 1 is an example of a system that uses environment-aware security tokens.

Security tokens are often used to give authorized users access to secure assets such as computing devices or files stored within the computing devices. Such security tokens can allow, for example, secure single sign-on (also referred to as S3) capabilities in systems that provide access to various resources. A security token can include, for example, a two-factor authentication security mechanism that authorizes access to assets associated with a network. Security tokens can be stored on a general-purpose computing device such as a desktop computer, laptop computer, or handheld wireless device (e.g., a mobile phone, e-reader, or tablet) and used to access various assets (e.g., files or documents) using the computing device.

Some security tokens (e.g., security tokens provided by a shared secret or public-key cryptography architectures) may be vulnerable to threats based on duplication of underlying cryptographic material. For example, a malicious entity (e.g., a human user such as a hacker, or software entities such as a computer virus or other malicious software) may breach the security of a network to steal data in the form of documents or other files. In such cases, the stolen files may be stored on a storage device conveniently accessible to the malicious entity, and content of the files may potentially be used in illegal or harmful activities. This can happen, for example, when a malicious entity attacks a financial institution such as a credit card company and is able to copy files that include sensitive user information such as username and password pairs. Such sensitive information can also be obtained directly from the users, for example, via phishing attacks. The sensitive information can then be supplied to a token generating authority (e.g., a secure website) to obtain the security tokens needed for accessing, for example, user accounts.

In a shared secret architecture, a configuration file is typically generated for each end-user. The generated configuration file can include, for example, a username, a personal identification number, and a configurable "secret" associated with the particular user (e.g., answers to questions posed to a user). The security provided by the shared secret architecture is largely dependent on the configuration file. Therefore, in the event the configuration file is stolen or copied, the security provided by the shared secret architecture may be compromised.

Architectures such as public-key cryptography, or asymmetric cryptography provide some advantages over the shared secret type architecture by requiring two separate keys, one of which is secret (or private) and the other public. The two keys are mathematically linked, and can be used in conjunction to provide security. For example, the public key can be used in encryption or to verify a digital signature, and the private key can be used in decryption or to create a digital signature. However, the security provided by architectures such as public-key cryptography may also be compromised if both keys are stolen or duplicated.

The technology described in this document improves security of network assets (documents, files, devices etc.) by generating environment-aware security tokens that are specific to the corresponding assets. The technology can be used both independently, and in conjunction with other security technologies, such as provided via third party software application or social network services. For example, an environment-aware security token for a document can be generated from environmental metrics associated with a network on which the document is authorized to reside. Examples of the environmental metric can also include various parameters associated with an asset such as asset name, asset ID (GUID, or UUID), asset class, (e.g., whether the asset is a device, document, user profile, system data, or security policy data), security token keys, security objects, etc. Examples of parameters associated with a device include assigned addresses (e.g., MAC addresses), serial numbers, device name, device ID, and security object status (e.g., whether security object is attached or embedded, whether the object is a null object, etc.) Examples of parameters associated with a user include user name, user ID, and user profile data structures (e.g., data structures representing data on various user metrics). Examples of parameters associated with a document include document name, document ID, and document profile data structures (e.g., data structures representing data on document metrics). Examples of parameters associated with system and security policy data include system name, system ID, security policy name, security policy ID, and data structures representing security policies.

The generated environment-aware security token can be configured to include an identification of the particular network, and can then be associated with the document to "lock-down" the document to the particular network (often referred to as the home network). The lock-down can be such that the document cannot be accessed from any non-authorized device, for example, a device that is not authenticated to the particular network. For example, the environment-aware security token can be embedded, attached, encapsulated, or otherwise associated with the document in a way such that the environment-aware security token deletes, digitally destroys, or otherwise prevents access to content of the document if the document is moved or copied to or attempted to be accessed from a device not authenticated to the home network. In some implementations, the technology described in this document can be deployed in conjunction with other security architecture such as the shared secret architecture or public-key cryptography architecture described above.

The technology described in this document can be used to control physical or virtual access to a physical or virtual storage location. In some implementations, file system and document attributes can be used to generate environment-aware security tokens that provide access to the storage locations and/or encrypt file content. Various restrictions can be imposed based on the environment-aware security tokens. In some implementations, the environment-aware security tokens can be used to restrict user(s) or device(s) from accessing an asset. In some implementations, the environment-aware security tokens can be used in restricting documents from being copied from the original storage location. Moreover, file attributes can be configured such that corresponding environment-aware security tokens can be used to prevent unauthorized copying and/or downloading. For example, the file attributes can be controlled via the attached or embedded security tokens (e.g., embedded security objects) that are verified by a token server with or without a hardware dongle.

In some implementations, the technology can be implemented as a part of an operating system (OS). For example, the security layer provided by the technology can be used to acquire control over the file system of the corresponding OS to control operations such as read, write, and copy. The security layer can be used, for example, to control and verify various assets via attached, encapsulated, or embedded security objects. In some implementations, for example where a security object is encapsulated together with the corresponding file or document into a separate entity (e.g., an application or executable file), the entity can be configured to destroy, delete or otherwise digitally shred the contents of the file or document upon detecting dissociation from the home network. The dissociation can be detected, for example, when the entity fails to establish a connection with a token server that controls administration of the security objects. In some implementations, the entity can also be configured to collect information on one or more metrics associated with the environment from where an access attempt is being made. For example, in the event of a security breach (e.g., a hack), the entity can be configured to transmit details of the environment (e.g., MAC address, IP address, device serial number etc.) back to the token server.

Dissociation from the home network can encompass various situations. In some implementations, the dissociation can include a physical connection loss with the home network. The home network can be defined or configured by choosing a set of assets (devices, user profiles, storage locations, files, documents, operating systems etc.) that are authenticated to be associated with a particular asset such as a device or document. In some implementations, the dissociation from the home network can include an access attempt from an asset or entity that is not included within the home network as configured for the asset on which the access attempt is being made. In one example, the dissociation can include access attempt from a user profile not associated with the home network as configured for the corresponding asset. In another example, a dissociation can include storing a particular asset at (or accessing the particular asset from) a storage location outside the home network as configured for the particular asset. In yet another example, a dissociation can include disconnecting a device from a network (including a physical network or a virtual network such as a virtual private network) that is not a part of the corresponding home network.

The operating system can therefore be configured such that data cannot be removed from a home network without appropriate permissions, for example, explicit user and/or device authorizations. The technology can therefore be configured to act as a gateway to physical and virtual storage locations on the home network or on registered devices with user(s) privileges. Documents can be assigned identifiers as they are stored in secure storage locations within the home network. Assets such as documents, devices, files and user profiles can be classified and a database of asset data can be created from data collected from the assets. Security objects such as environment-aware security token can then be created from security keys defined based on the asset data.

In some implementations, the technology described in this document provides improved security for various assets in a network. For example, computing devices such as laptop computers, desktop computers, printers, scanners, servers, storage devices, network devices, as well as electronic files stored within such computing devices can be made more secure via the environment-aware security tokens described in this document.

FIG. 1 shows an example of a system 100 that uses environment-aware security tokens. The system 100 includes various network assets (also referred to herein simply as assets) connected to a server 106 over a network 102. The term asset, as used in this document, refers to devices that are directly or indirectly associated with a network, as well as electronic files that can be stored on a device associated with the network. For example, the assets can include a personal computing device 103 (e.g., a laptop computer), a printer 110, a desktop computing device 112, a mobile computing device (e.g., a smartphone, tablet or e-reader) 114, a storage device 116, or a server 125 (which can also be referred to as a remote server). In some implementations, the assets can include a passive device such as a credit or debit card 108 or a radio frequency identification (RFID) tag that can communicate over the network 102 via an appropriate reader (e.g., a credit/debit card reader and RFID tag reader, respectively). The system 100 can include none, one, or more devices of the various types described above. In some implementations, a portion of the network 102, and/or one or more devices coupled to the network 102 can form at least a portion of a home network defined for a particular asset.

In some implementations, the assets include electronic files 104 that can be stored, accessed, read, processed, or otherwise acted on by a device, such as one or more of the devices associated with the network 102. The files 104 can include, for example, documents, software packages, executable files, binary files, non-binary files, or other files that can be stored or processed electronically. The files 104 can be associated with various applications and include various features. For example, the files 104 can include word processing documents, spreadsheets, text files, drawing files, data files (e.g., database files, and/or information), and multimedia files (e.g., audio, video, system data files etc.).

The files 104 can be formatted in accordance with an application and/or operating system associated with individual files. The formats of the files can be identified, for example, by an appropriate file name extension such as .exe (for executable files), .htm (for hypertext markup language (HTML) files), or .txt (for text files). In some implementations, the electronic files 104 can include various types of records and files stored in different types of databases. For example, the electronic files 104 can include medical records, academic records, health records, business records, government records, criminal records, real-estate records, financial records, social network data etc. The electronic files 104 can be stored, for example, on a single device (e.g., a laptop computer or server), or can be distributed across several devices (e.g., multiple servers, multiple trays in a data center, or multiple virtual machines in a distributed computing/storage system such as a cloud-based system).

In some implementations, the electronic files 104 include metadata information about the corresponding files. The metadata can include, for example, structural metadata that relates to design and specification of data structures, and descriptive metadata that relates to additional information the data content. The metadata can include, for example, information on a location of creation of the document, means of creation of the document, time and date of creation of the document, author or source of the document or the data within the document, and security policies associated with the document. In some implementations, the metadata information about a particular document can be used in generating an appropriate environment-aware security token for the particular document. For example, if the security policies included within the metadata establishes that the corresponding document can only be viewed by personnel from the Human Resources department of a company, the environment-aware security token for the document can be configured such that the document is viewable (and/or printable) only on devices associated with the Human Resources department.

In some implementations, the system 100 includes a server 106 that coordinates generation and distribution of environment-aware security tokens 120. The server 106 may also be referred to as a security token server or simply a token server. In some implementations, the server 106 receives asset information 118 related to the various assets associated with the home network and generates the corresponding environment-aware security tokens 120. In some implementations, the server 106 itself may be associated with an environment-aware security token 120 such that the server is not accessible from a device not included in a home network. Even though FIG. 1 shows a single server 106, multiple servers (e.g., a server farm), and/or one or more remote servers 125 can be used for implementing the functionalities of the server 106. The server 106 can be a dedicated server, or the functionalities of the server 106 can be provided by a server that performs other tasks.

The asset information 118 can include identification information related to the assets, including for example, one or more of a serial number of a device, a media access control (MAC) address, a file path, a registry key, a network identifier, an internet protocol (IP) address, a file-type identifier, a user-profile identifier, or other identifying information that identifies that a particular asset is connected to, authenticated to, or otherwise associated with the home network. In some implementations, the home network may be defined by the serial numbers or MAC addresses of a group of physical devices, such as the devices owned, administered, or otherwise controlled by a company or institution. In some implementations, the asset information 118 can include identification of electronic files and documents and/or the corresponding storage locations on various devices associated with the home network. In some implementations, the asset information can include user profile information that identifies various users authorized to access the assets associated with the home network.

In some implementations, the asset information 118 can also include various security policies related to the usage of the assets. The security policies can be retrieved, for example, from a storage device connected to or otherwise accessible from the home network. The security policies can be used, possibly in conjunction with other asset information 118 to create environment-aware security tokens for one or more assets of the home network. The security policies can include, for example, an identification of devices or profiles of users (also referred to herein as user profiles) authorized to access a particular asset such as a document, and can be configured for example by authorized personnel. The security policies for a company may specify that a particular document is viewable only by the board of directors. In such a case, the environment-aware security token for the particular document can be configured such that the document can be viewed only when accessed from a user-profile associated with a member of the board of directors. The security of the document can be enhanced further by configuring the environment-aware security token to allow access to the document only from personal devices associated with members of the board. The environment-aware security token for the document can therefore be generated based on a selectable portion of the asset information 118. By allowing such configuration of the environment-aware security tokens, the technology described in this document can be made scalable, granular, and flexible to suit various types of security needs.

The server 106 may obtain the asset information 118 by employing one or more techniques. In some implementations, the asset information 118 may be obtained by deploying a network agent configured to gather information on the various assets. For example, the network agent can be deployed by the server 106 as a client application 117 that is installed on the devices associated with the home network. In some implementations, the client application 117 can be pushed out by the server 106 to the devices that authenticates to the home network. In some implementations, the client application 117 can be pre-installed on various devices (e.g., as a part of the corresponding operating system) and authenticates to the home network when the devices attempt to communicate with the home network. In some implementations, the client application 117 itself may include a corresponding environment-aware security token that prevents the application 117 from executing when dissociated from the home network. In some implementations, the network agent can be similar to the agents described in U.S. Pat. No. 7,190,478 and U.S. Pat. No. 7,872,772, the contents of which are incorporated herein by reference.

Figure 2A:
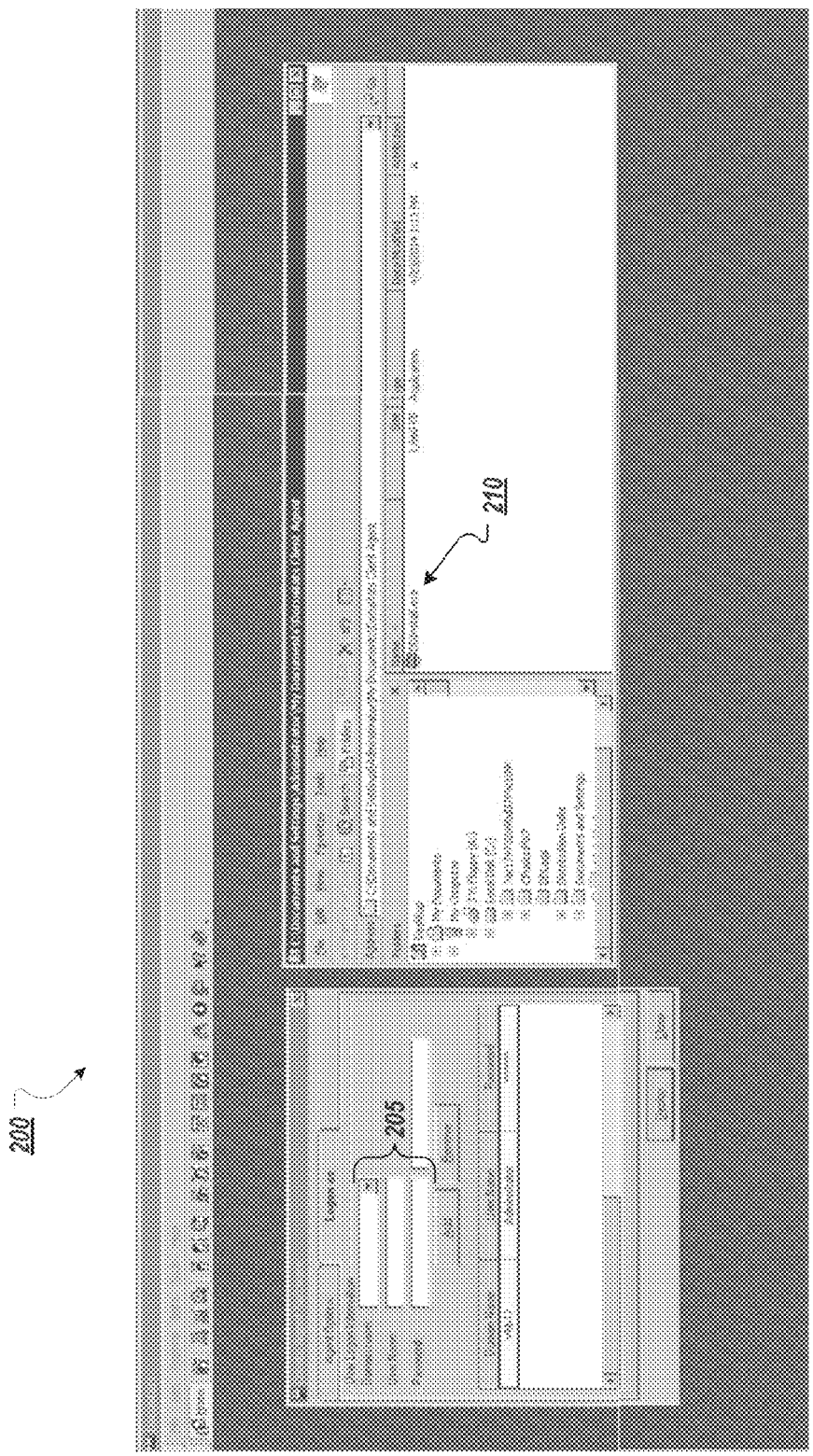
FIGS. 2A-2B show examples of user-interfaces.

In some implementations, the deployment of the network agent can be configured via a user interface such as the example 200 depicted in FIG. 2A. A user may be able to download and install the network agent on a device using the user interface 200, which in turn may be launched using the client application 117. For example, upon launching the client application 117, the user may be presented with the user interface 200 to authenticate a user profile and/or device to the home network. This can be done, for example, via controls 205 (e.g., fillable text fields, selectable radio buttons, or other controls for entering credentials) provided within the interface 200. Upon successful authentication, the user may be directed to a storage location from which the network agent may be installed on the device. For example, the user may be directed to a storage location that stores an executable file 210 configured to install the network agent on the device. In some implementations, authorized personnel (e.g., a network administrator) may be able to install the network agent on remote devices, for example, via the user interface 200. In some implementations, the network agent can be configured to be deployed on a device automatically, for example, when a device registers with or authenticates to the server 106.

Figure 2B:

In some implementations, the network agent can include one or more software package-specific plug-ins or add-ins (also referred to herein as document agents) that are installed on devices associated with the home network. FIG. 2B shows an example user interface 250 where such a document agent is installed into the word processing application (MICROSOFT WORD in this particular example). Such a document agent may allow a user to perform various configurations on a document, for example, to make the document compatible with environment-aware security tokens, and/or specify security parameters of the document. For example, the document agent may allow, for example via a second user interface 255, to specify whether a password would be required to access the document, or if one or more actions (e.g., printing, editing, copying etc.) should be restricted. In some implementations, the document agent can also be configured to communicate asset information 118 (i.e., information related to the document) to the server 106. For example, activating the control 260 may initiate a communication between the document agent and the server 106 to provide corresponding asset information 118 to the server 106 and receive an environment-aware security token 120 generated by the server 106 based on the corresponding asset information 118. In some implementations, the user interface 255 can be configured to allow a user to specify user-defined security parameters such as cypher keys or passwords to a document, such that the document had additional protection, for example, against unauthorized internal access (i.e., access associated with devices or user-profiles associated with the home network).

In some implementations, the document agent can also be configured to integrate the received environment-aware security token 120 into the corresponding document. For example, the document agent can be configured to embed the received environment-aware security token into the page description language (PDL) of a document. In general, PDL is a language that describes the appearance of a printed page at a higher level than an actual output bitmap. Examples of PDLs include PostScript, Printer Command Language (PCL), Portable Document Format (PDF), and mark up languages such as Open XML Paper Specification (XPS) and Hypertext Markup Language (HTML).

In some implementations, the document agent can be configured to encapsulate the received environment-aware security token with the document to create, for example, an executable file. Such an executable file can be configured such that an execution point is verified to be within the home network (based on the information within the encapsulated environment-aware security token) before an access to the encapsulated document is allowed. Upon determining that the executable file is being accessed from a location outside the home network (or an otherwise unauthorized device or storage location), access to the encapsulated document is prevented. In some implementations (such as for high security applications), any unauthorized attempt to access the executable file can cause a destruction (e.g., by deletion or digital shredding) of the encapsulated document. Other functionalities such as logging unauthorized attempts, triggering one or more alerts, or starting focused investigations, etc. may also be initiated through operations of the agent and use of such environment-aware security tokens.

Referring again to FIG. 1, in some implementations, the network agent is configured to scan for assets residing on devices and/or storage locations and provide the obtained asset information 118 to the server 106. In some implementations, the network agent executes from the server 106 (or another device associated with the home network) and polls other devices and storage locations of the home network to obtain the asset information 118. The obtained asset information can be associated with (i.e., linked to) a corresponding security token and the association or link information can be stored in a database.

In some implementations, the obtained asset information is linked to a corresponding asset using identifiers assigned to the assets. Examples of such identifiers can include globally unique identifiers (GUIDs), universally unique identifiers (UUIDs), etc. Such identifiers may enable unique identification of the various assets within the system 100. For example, one or more documents, files, devices, and storage locations within the system 100 may be uniquely identified using such identifiers. Depending on the finite size of the identifiers, in some cases two different assets may share the same identifier. However, the identifier size and generation process may be selected so as to reduce a probability of such an occurrence. In some implementations, 128 bit values (e.g., that are displayed as 32 hexadecimal digits such as 21EC2020-3AEA-4069-A2DD-08002B30309D) can be used as the identifiers assigned to the various assets. The identifiers can be generated, for example, via deterministic, random or pseudo-random processes. Alternatively, identifiers already associated with the assets (e.g., identifier issued by the manufacturer, the home network, or users/administrators of the home network) can also be used.

In some implementations, the network agent includes an automated browser (also referred to as a robotic browser) that obtains the asset information 118 from some or all of the various devices and other assets associated with the home network. Such an automated browser can be used, for example, to collect information about devices on the network, such as identifiers (GUID, UUID, etc.) associated with computing devices, printers, and/or storage devices connected to the network. Such an automated browser can also be used, for example, to scan storage locations on various devices to identify asset information such as file attributes of files associated with operating systems of devices connected to the home network and/or operating systems of devices connected to the home network via a remote login process (e.g., via a virtual private network (VPN)). In some implementations, the automated browser can be configured to attach identifiers such as GUIDs and UUIDs to the obtained asset information. In some implementations, such an automated browser (which may or may not be the same browser used for collecting information about the devices on the network) can also be used to embed, attach, encapsulate, or otherwise associate an environment-aware security token with a corresponding document or other asset. For example, the automated browser can be configured to include an environment-aware security token into the header portion of a document via a process such as code injection (implemented, for example, using a programming language such as JAVA). This can be done, for example, by providing the automated browser appropriate permissions to modify document attributes. Such permissions can be configured or modified based on the security context and group policies associated with the home network.

The server 106 can be configured to generate corresponding environment-aware security tokens 120 for one or more assets associated with the home network, based on at least a portion of the received asset information 118. The generated environment-aware security token 120 can be configured to control how and/or by who the corresponding asset may be accessed. Once an environment-aware security token 120 is generated and linked to a particular asset, the asset may be used only in accordance with the security policies encoded within the environment-aware security token 120. For example, the environment-aware security token 120 for a document can be configured to include an identification of the home network such that the document can be accessed only from devices connected to the home network. In some implementations, the environment-aware security token 120 for a document or file can be configured such that the document is accessible only on a selected set of devices (identified, for example, using serial numbers or MAC addresses) and/or using a user profile from an approved set. For example, in a corporate setting, the environment-aware security token 120 for a particular document can be configured such that the document is accessible only by management personnel (identified, for example by user profiles), and/or on devices (e.g., laptops) associated with the personnel.

The environment-aware security tokens 120 can also be used for increasing security and/or controlling accessibility of hardware devices. For example, an environment-aware security token 120 for a hardware device (e.g., a printer, scanner, copier, fax machine, or multi-function device (MFD)) can be configured such that the hardware device would not function outside the home network. This can be useful, for example, in increasing device security in a corporate setting and/or to prevent usage of corporate resources for personal use.

The process of generating the environment-aware security tokens 120 can be made scalable, granular, and customizable to provide flexible security solutions. For example, the environment-aware security tokens 120 can be configured to control a level of access for various assets. For example, the environment-aware security token 120 of a particular document can be configured such that a only a select group of people (as identified by corresponding user profiles) is able to change the content of the document, but a larger group of people associated with the home network (e.g., all employees of a company) is able to view the document without being able to make any changes.

In some implementations, the environment-aware security token 120 for an asset can be configured such that the asset may be viewed or accessed from outside the home network, but no changes or edits to the asset may be made. This can be useful, for example, in a social network, where a user registers a plurality of devices (e.g., home computer, office computer, and personal mobile devices) that the user plans to use in accessing the social network account. Environment-aware security tokens 120 can then be generated for each device (for example, by the social network service provider) and associated with the corresponding user profile. In such a case, the user is able to update the corresponding social networking account (e.g., in the form of posts, images, videos etc.) only from the devices that are associated with the user profile. This way even if the security of the account is compromised (e.g., via a phishing attack that obtains the username-password pair for the user account), a malicious entity (e.g., a hacker) in possession of the account credentials would still not be able to make changes to the user account from devices that do not have the environment-aware security tokens 120 associated with the corresponding user profile. For example, the malicious entity would not be able to post potentially embarrassing or harmful content to the user's account in spite of obtaining the credentials needed to log into the user's account. Security of other web-based accounts such as e-mail accounts, online banking accounts, trading accounts, and e-commerce accounts can therefore be increased by using environment-aware security tokens 120 to associate a predetermined set of physical devices with the corresponding accounts. In some implementations, environment-aware security tokens can be generated for a particular user of a social networking service for the network resources or assets associated with the corresponding user profile. Examples of such network resources and assets can include, for example, network segments, storage locations, and files associated with the user profile within the social network service infrastructure. In such cases, even if the security of the social network service is compromised, the user files stored within the infrastructure is protected by the additional security of the corresponding environment-aware security tokens. In some implementations, such additional security can be provided by the social network service, for example, in exchange for a fee for the same.

In some implementations, the home network associated with a given environment-aware security token can be configured by a user. For example, for an environment-aware security token 120 associated with a credit card 108 can be configured to block one or more types of transactions using the card. For example, the environment-aware security token 120 corresponding to the card can be configured such that certain types of products or commodities may not be bought using the card, and/or the card may not be used at a predefined set of vendors. This can be useful, for example, in implementing parental control on add-on cards given to young adults. For example, the environment-aware security token 120 for an add-on card can be configured such that the corresponding home network includes only on-campus shops and vendors in a school. In such a case, the environment-aware security token 120 of the add-on card prevents usage of the card to buy merchandise from shops or vendors outside the campus. In some implementations, an environment-aware security token can also be associated with virtual instances of the credit card 108, for example, credit cards represented by online accounts or smartphone applications.

In some implementations, the server 106 can be configured to generate the environment-aware security tokens 120 as language agnostic objects that can be developed using various programming languages capable of accessing and processing binary data types such as the ones associated with the asset information 118. For example, the environment-aware security tokens 120 can be implemented as objects generated using the Component Object Model (COM) standard that is a binary-interface standard for software components developed by MICROSOFT. The standard can be used, for example, to enable inter-process communications and dynamic object creation in a large range of programming languages. In some implementations, language agnostic objects such as COM objects allow reuse of objects with no knowledge of the corresponding internal implementation. For example, the objects may be implemented using interfaces that are agnostic to the implementation details. Different allocation semantics of various programming languages can be accommodated, for example, by making objects responsible for their own creation and destruction through processes such as reference-counting. Reference counting can be used, for example, as a technique of storing the number of references, pointers, or handles to a resource such as an object, block of memory, disk space or other resource. Casting between different interfaces of an object can be achieved, for example using query processes such as the QueryInterface.

In some implementations, the server 106 is configured to generate the environment-aware security tokens 120 for corresponding assets as objects (e.g., COM objects) using at least portion of the received asset information 118. For example, an object corresponding to an environment-aware security token can include data fields corresponding to the portions of the asset information used in generating the environment-aware security token, and procedures associated with intended functionalities of the environment-aware security token.

In an object-oriented programming paradigm, the procedures associated with the functionalities may be referred to as methods. In some implementations, the methods associated with an object corresponding to an environment-aware security token can be related to, for example, one or more of the following functionalities: i) detecting environmental parameters for an asset associated with the environment-aware security token, ii) authenticating the asset with a token server (e.g., server 106), iii) allowing access to the asset upon authentication, iv) preventing access to the asset upon detecting a dissociation from the home network, and/or v) tracking various activities related to accessing the asset.

The environment-aware security token 120 embedded or otherwise integrated with an asset can be configured to detect environmental parameters associated with the asset. For example, if the environment-aware security token 120 is embedded into document metadata, the associated object (e.g., COM object or other security object) can be configured to detect a serial number of the device that the document is being accessed from or stored on. The environment-aware security token 120 can be configured to detect one or more other environmental parameters such as user-profile information, security policies associated with the document, a type of access being attempted on the document, etc.

The environment-aware security token 120 of an asset can also be configured to attempt an authentication of the asset (or the attempted use of the asset) using the detected environmental parameters. For example, the environment-aware security token 120 can be configured to communicate the detected environmental parameters to the server 106 to receive an indication if access to the asset can be allowed. Alternatively, the environment-aware security token may also perform at least a portion of the authentication locally, for example, based on an identification of the home network encoded within the environment-aware security token 120. If a connection to the server 106 cannot be established (for example, due to loss in Internet connectivity), a message may be displayed notifying the user that the asset cannot be accessed immediately. In some implementations, the authentication can be triggered when an attempt to access the corresponding asset is made (e.g., when a user attempts to open a document). The environment-aware security token 120 can also be configured to be synchronized with the server 106 periodically, for example, after predetermined time intervals or when any changes to the corresponding asset is detected.

In some implementations, upon determining that an access to the corresponding asset may be allowed, the environment-aware security token 120 can allow access to the corresponding asset. For example, upon determining that an authorized user is attempting to open a document (as indicated, for example, by authentication information received from the server 106), the environment-aware security token 120 can allow the user to access the document. The access may be allowed based on additional security policies associated with the document. For example, the environment-aware security token 120 may allow a read-only access to a document based on determining that the user attempting to access the document is not authorized to edit the document.

On the other hand, if the environment-aware security token 120 determines that an access to the asset is unauthorized, the access may be prevented. For example, if the environment-aware security token 120 determines that a corresponding document is residing on a device that is not authenticated to the home network, access to the content of the document may be denied. In high security scenarios (e.g., for confidential or sensitive military or healthcare related documents), the environment-aware security token 120 can be configured to destroy, delete or digitally shred the corresponding document upon detecting unauthorized access attempts. This can be done, for example, to prevent any additional attempts to breach the security provided by the environment-aware security token 120. Such procedures can of course be implemented selectively, for example, pursuant to guidelines that prevent deletion or destruction of original documents, files or other assets due to accidental access attempts. In addition, the technology described in this document can be used in conjunction with data back-up and secondary storage techniques to prevent accidental permanent deletion of data.

In some implementations, the environment-aware security tokens 120 can also be used for tracking usage of the corresponding assets. For example, the environment-aware security token 120 associated with a document can be configured to log access information (e.g., creation credentials, time and nature of access attempts, location of access attempts, device ids, etc.) for the corresponding asset. The access information can be stored, for example, on a local storage device within an encrypted file system. The stored access information can then be synchronized with information stored at the server 106 during subsequent communications between the environment-aware security token 120 and the server 106. In some implementations, a separate agent such as a virtual private network (VPN) agent can be used to communicate the access information to the server 106. Such an agent may itself be associated with a corresponding environment-aware security token 120, and may use database management systems such as MySQL, ORACLE, or MICROSOFT SQL to manage communications with the server 106. In some implementations, the access information may also be used to update the environment-aware security token 120 associated with the document. The environment-aware security tokens 120 can therefore be used to generate and maintain an audit trail of asset usage, thereby further increasing security and accountability of asset usage.

In some implementations, the asset usage log stored in the token database can be processed, for example, by an artificial intelligence system to learn trends associated with various assets such as devices, user profiles, and applications. Various types of machine-learning techniques may be used by such an artificial intelligence system. For example, various supervised, unsupervised, or semi-supervised machine learning techniques can be used in identifying, classifying, or otherwise learning trends and/or behaviors associated with the various assets. One or more tools can be used in implementing such machine-learning techniques. Examples of such tools include decision trees, artificial neural networks, support vector machines, Bayesian statistics, classifiers, Markov models, and conditional random fields.

Information obtained by using the machine-learning techniques on the asset usage logs can then be used in increasing security of the assets. For example, if a malicious entity (e.g., a hacker or malicious software) tries to access an asset such as a document, an agent can be configured to detect fraudulent behavior based on detecting a deviation from "normal" behavior as learned from the asset usage logs. For example, if the log corresponding to a user profile shows that the user typically logs in within the first one or two attempts, an occurrence of repeated failed log-in attempts may be flagged as a potential security breach. In such cases, the agent can be configured to capture identification of the accessing device (e.g., IP and/or MAC address of the device). If the agent detects malicious software (e.g., a virus, trojan, or payload software), the agent can be configured to detect the IP and/or MAC address of the server the software communicates with (or reports to). From the identification of the accessing device, additional information such as geographical location, manufacturer, or serial number may also be determined. Such information can be used for taking appropriate action against the security breaches, possibly with the help of law enforcement agencies.

In some implementations, the environment-aware security tokens 120 generated by the server 106 is stored within a token database 122 accessible to the server 106. The token database 122 may be stored in a storage device within the server 106 or at a remote storage location or the remote server 125 accessible to the server 106. The token database 122 can be used to store information about the environment-aware security tokens 120 generated at the server 106. For example, the token database 122 may store information linking the environment-aware security tokens 120 to the corresponding asset identifiers such as the GUIDs or UUIDs. The information linking the environment-aware security tokens 120 to the corresponding identifiers can be used, for example to identify home networks associated with the corresponding assets, and/or to authenticate access attempts on the various assets. For example, if a user attempts to access a document from a particular device, the server 106 may authenticate the access attempt based on information linking a corresponding environment-aware security token 120 to the identifier associated with the document. In some implementations, the token database 122 also stores access information associated with the corresponding assets. For example, if an asset (such as a document) is updated, modified, created, deleted, or otherwise acted on, such access information can be stored in the token database linked, for example, to the corresponding asset identifiers.

In some implementations, the server 106 may also be implemented using a distributed computing environment such as a cloud based system. In such cases, the server 106 may be implemented on a pool 105 of multiple virtual machines 107. A virtual machine 107 can be a set of computing resources (processors, memory, software etc.) that can be used for executing computing tasks. The computing resources can be provided by one or more independent providers (e.g., providers of cloud computing or other distributed computing services). The security of the virtual machines 107 used to implement the server 106, or portions thereof, can be increased, for example, by associating the virtual machines 107 with corresponding environment-aware security tokens 120.

Figure 3:
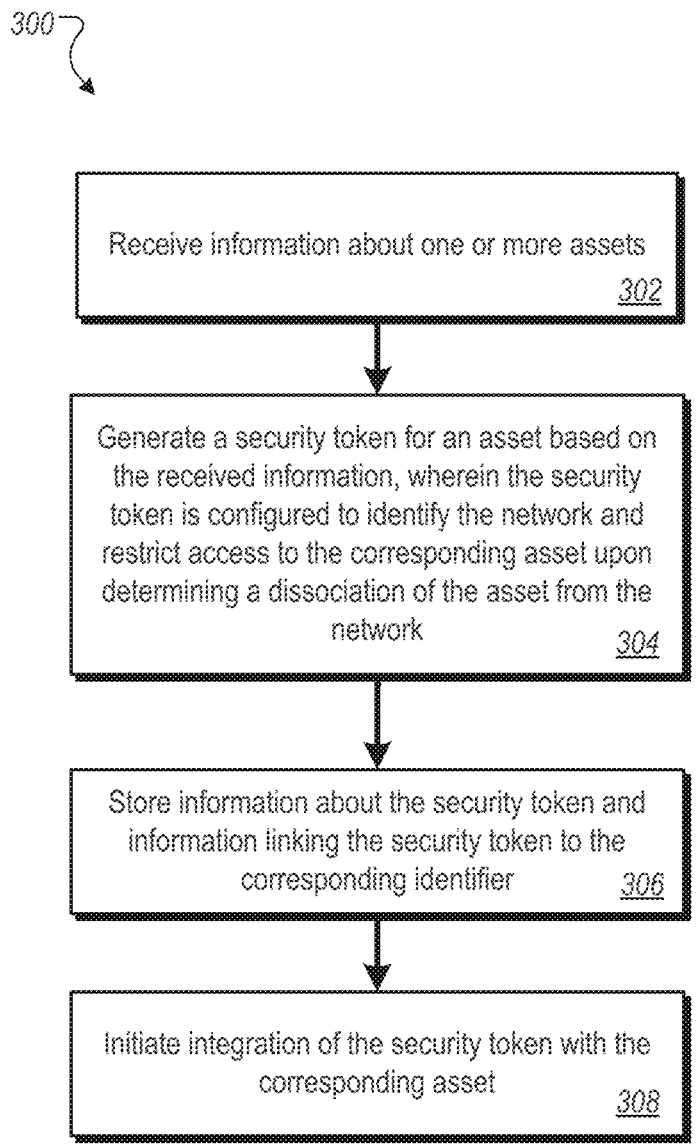
FIG. 3 is a flowchart depicting an example sequence of operations associated with generating a security token.

FIG. 3 shows a flowchart 300 depicting an example sequence of operations for providing environment-aware security tokens for various assets. In some implementations, at least a portion of the operations of the flowchart 300 can be executed, for example, at the server 106 described above with reference to FIG. 1. The operations include receiving information about one or more assets (302). The various assets may be identified, for example, by a corresponding identifier such as a GUID or UUID. The assets can include, for example, one or more of: a device connected to the home network, a file stored on a storage device connected to the home network, a user-profile associated with the home network, or any other asset as described above with reference to FIG. 1. The information can include any of the asset information 118 described above. For example, the information can include one or more of a serial number of a device, a media access control (MAC) address, a file path, a registry key, a network identifier, an internet protocol (IP) address, a file-type identifier, a user-profile identifier, and one or more policies associated with the network. In some implementations, the information about the one or more assets may be received from an agent deployed on the home network and configured to scan the assets associated with the home network. For example, when a device authenticates to the home network, the agent may be installed on the device to obtain information related to one or more assets associated with the device.

Operations can include generating a security token for an asset based on the received information (304), wherein the security token is configured to identify the home network and restrict access to the corresponding asset upon determining a dissociation of the asset from the home network. The security token can be generated as a language agnostic object (e.g., a COM object), and can be embedded, attached, encapsulated, or otherwise associated with the corresponding asset such that that security token deletes, digitally destroys, or otherwise prevents access to the asset if the asset is dissociated from the home network. In some implementations, the security token can be generated in accordance with one or more security policies associated with the corresponding asset. The security can be substantially similar to the environment-aware security tokens described above.

The dissociation of an asset from the home network can be determined in various ways. For example, determining the dissociation of the corresponding asset from the home network can include determining that the corresponding asset is not connected to the home network, or is not stored on a device connected or registered to the home network. In some implementations, determining the dissociation of the corresponding asset from the network can include detecting an access attempt from a user-profile that is not associated with the home network. In some implementations, the determining the dissociation can include determining a deviation from security policies associated with the corresponding asset.

Operations also include storing information about the security token and information linking the security token to the corresponding identifier (306). The information can be stored, for example, in a database such as the token database 122 described with reference to FIG. 1. In some implementations, the information stored in the database may be updated based on, for example, how the various assets are accessed, used, or updated. For example, the information stored in the database can include logs representing how, where and by who a particular asset is accessed.

Operations can also include initiating integration of the security token into the corresponding asset (308). In some implementations, initiating the integration can include providing the security token to an agent that performs the integration. For example, the security token for a document can be provided to an agent that is configured to inject a code corresponding to the security token in a portion of the document. In some implementations, the code injection can be performed, for example, by an automated browser such as the robotic browser described above. The code or object (e.g., a COM object) corresponding to the security token for a document or file can be injected within the metadata for the document/file, for example, into a header. In some implementations, the code or object corresponding to the security token for a document can also be embedded within a PDL of the document. In some implementations, the security token can be encapsulated together with the corresponding document or file into a separate file. For example, an agent or application can be configured to generate an application or executable file that encapsulates a security token (e.g., a COM object) with the corresponding document or file. The application, executable file, or a file including the security object can be stored, for example, as an encrypted document at a storage location. In some implementations, information about the storage location of the encrypted document can be stored in the token database 122. In some implementations, a distributed storage location (e.g., a cloud based storage location) can be used for storing the encrypted documents. The storage location can be defined to be a part of the home network for the corresponding asset. In addition, by also threading or otherwise associating a predefined set of user profiles and/or device profiles to the home network, access to the asset can be restricted to be from within the home network defined for the asset.

During runtime, access to an asset can be controlled based on information received from the corresponding security token associated with the asset. For example, a security token can provide information on environment parameters associated with an attempt to access an asset. The environment parameters can include, for example, information on the access point, user profile, or security parameters associated with the asset. The received information may be compared to the stored information to determine whether the access attempt is considered to be from within a home network associated with the asset. Upon determining that the access attempt is indeed from within the home network and/or satisfies security policies associated with the corresponding asset, the access attempt may be authorized. This can be done, for example, by providing permission information that signals the security token to allow access to the asset.

In some implementations, an asset such as a document embedded with an environment-aware security token can be stored as an encrypted document within a secure storage location within the home network defined for the asset. The encryption used in storing the asset within the secure storage location can be based on, for example, a security key specific to a particular user. This can be used, for example, to store a user's documents within a storage system associated with a multi-user system such as a social network service or e-mail service. Access to the asset can be controlled, for example, based on detecting that the asset is stored at a storage location that is associated with the corresponding home network. In some implementations, additional layers of security can be provided, for example, by checking whether the user profile and/or device profile associated with the access request is authenticated to the home network. In some implementations, access to the home network can be provided, for example, via a hyperlink (e.g., such as one embedded in an email) that is associated with an environment-aware security token. A user or device that is not otherwise associated with the home network may be able to access an asset within the home network using such a hyperlink. In some implementations, a user may be authenticated to the home network via an authentication request (e.g., a request for biometric authentication) that is associated with an environment-aware security token.

The security technology described in this document can be used both independently and in conjunction with other security systems and architectures. For example, the environment-aware security tokens described above can be used in conjunction with security and cryptography techniques such as biometric identification, symmetric keys, asymmetric keys, symmetric ciphers, transport layer security, and encryption techniques. For example, security for an online account that uses secure socket layer (SSL) can be increased by associating the account with a corresponding environment-aware security token to restrict editing capabilities to a user-selected set of devices. In some implementations, files (e.g., system files, data files, documents, voice files, image files, video files, or web files) stored on the home network can be stored with additional cryptography built into the security tokens utilizing for example, a symmetric key unique to a particular authorized user.

In some implementations (e.g., in high security scenarios), the environment-aware security tokens can be used in multiple layers to enhance security. For example, a file encrypted with an embedded COM object can be further encapsulated with another COM object to generate a file with double layer security. By configuring the security policies of the two COM objects differently, the security of the underlying file or document can be increased manifold. For example, the security policies can be configured such that the higher and lower layer files may be opened using two separate user profiles, thereby requiring not one, but two separate personnel to be involved in accessing the file. The encapsulation can be scalable allowing additional security to be incorporated as needed, for example, via increased layers of encapsulations.

The technology described in this document can be used in various applications, types of applications or combinations of applications. In some implementations, the environment-aware security tokens can also be used in identity verification services such as eAuthetication. Such identity verification services can be provided, for example, by a remote server to other distributed servers that are possibly distributed on the Internet or an intranet. Similar to credit card verification services that are provided by third parties to eCommerce web sites, identity verification services can verify identity of users to entities such as web sites or intranet servers. Various networking protocols and application programming interfaces may be used by such identity verification services. Examples of such networking protocols include the Remote Authentication Dial In User Service (RADIUS), which is a networking protocol for providing centralized Authentication, Authorization, and Accounting (AAA) management for users that connect and use a network service. In some implementations, the technology described herein can be used either in conjunction with or in lieu of such identity verification services to provide secure network-based services. For example, environment-aware security tokens can be used to secure files associated with network-based transactions such that the files are locked down to the physical attributes of the corresponding data center or server. Therefore, even if a malicious entity (e.g., a hacker) obtains the transaction files (for example, via hacking the point of sale corresponding to the transactions), the malicious entity could be prevented from opening the file to access the sensitive data included in the files. In another example, credit card data can be protected using embedded environmental security tokens on the card such that the corresponding user profile can be accessed only from the home network, data center, or cloud service registered with the card. The home network information in turn can be stored in a file protected by another environment-aware security token, to prevent the home network information from being compromised.

The environment-aware security tokens can also be used in securing mobile devices such as phones, tablets or e-readers. For example, a phone or other mobile device can be associated with an environment-aware security token. The environment-aware security token can be configured such that in the event of theft, biometric login or text login capabilities are suspended on detecting no activity (or suspicious activity such as multiple log in attempt) for a predetermined period of time. Because any harmful activities, such as ones involving downloading files, copying files or deleting files, require login authentication with the home network, the owners may get additional time to shut down the phone or mobile device to prevent theft of data.

Figure 4:
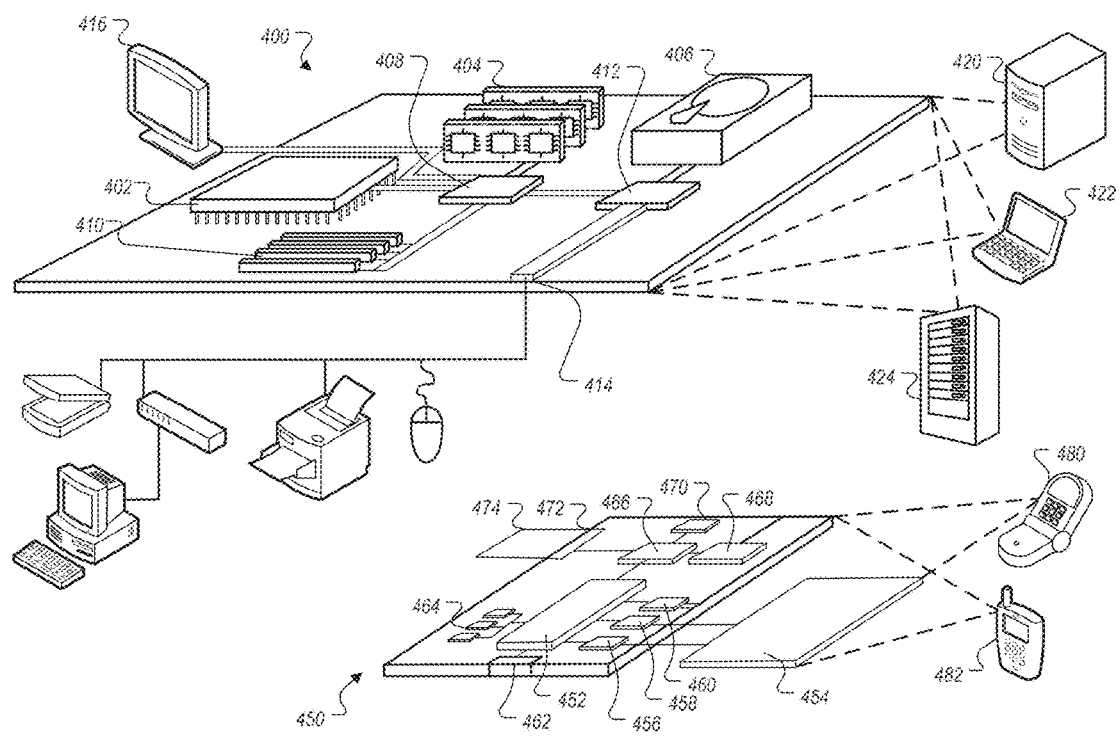
FIG. 4 is a diagram illustrating examples of computing devices.

FIG. 4 shows an example of a computing device 400 and a mobile device 450, which may be used with the techniques described here. Referring to FIG. 1, any of the devices 106, 110, 112, or 114 could be examples of the computing device 400 or the mobile device 450, and the server 106 could include one or more computer devices 400. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

The exemplary computing device 400 includes a processor 402, memory 404, a storage device 406, a high-speed interface 408 connecting to memory 404 and high-speed expansion ports 410, and a low speed interface 412 connecting to low speed bus 414 and storage device 606. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system). In some implementations the computing device can include a graphics processing unit. The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. Referring to FIG. 1, the storage device 116 could be examples of the storage device 406. In one implementation, the storage device 406 may be or contain a non-transitory computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on the processor 402.

The high speed controller 408 manages bandwidth-intensive operations for the computing device 400, while the low speed controller 412 manages lower bandwidth-intensive operations. Such allocation of functions is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user-interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, and so forth) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, biometric, or tactile input.

The systems and techniques described here can be implemented in a computing system that includes a back end component (e.g., as a data server), or that includes a middleware component (e.g., an application server), or that includes a front end component (e.g., a client computer having a graphical user-interface or a Web browser through which a user can interact with an implementation of the systems and techniques described here), or any combination of such back end, middleware, or front end components. The components of the system can be interconnected by any form or medium of digital data communication (e.g., a network such as the network 102 described with reference to FIG. 1A). Examples of networks include a local area network ("LAN"), a wide area network ("WAN"), and the Internet.

The computing system can include clients and servers (including remote servers). A client and server are generally remote from each other and typically interact through a communication network such as the network 102. The relationship of client and server arises by virtue of computer programs running on the respective computers and having a client-server relationship to each other.

Other implementations are also within the scope of the following claims.

What is claimed is:

1. A computer implemented method comprising:
receiving, at a server comprising one or more processing devices, information about multiple assets associated with a network of devices;
generating, by the server, for a first asset of the multiple assets, a first security token that is based at least on a portion of the received information about the first asset, wherein the first security token is configured to identify a first home network defined for the first asset, the first home network being specific to the first asset and being defined by a first selection of other assets;
generating, by the server, for a second asset of the multiple assets, a second security token that is based at least on a portion of the received information about the second asset, wherein the second security token is configured to identify a second home network defined for the second asset, the second home network being specific to the second asset and being defined by a second selection of other assets;
storing, in a storage device communicably coupled with the server, information about the first and second security tokens and information linking the first and second security tokens to the corresponding assets;
initiating, by the server, integration of the first and second security tokens with the corresponding assets by providing the first and second security tokens to the corresponding assets; and
restricting access, by the server, to the first or second asset upon detecting an occurrence of an unauthorized activity involving the corresponding asset, wherein the server is communicably coupled to the first home network and the second home network, and is configured to detect the occurrence of the unauthorized activity based on information received from the corresponding security token.

2. The method of claim 1, wherein detecting the occurrence of the unauthorized activity comprises determining a dissociation of the first or second asset from the corresponding home network defined for the asset.

3. The method of claim 2, wherein determining the dissociation of the first or second asset from the corresponding home network comprises at least one of: (a) determining that the corresponding asset is not connected to the corresponding home network, (b) determining that the corresponding asset is not stored on a device associated with the corresponding home network, or (c) detecting an access attempt from a user-profile not associated with the corresponding home network.

4. The method of claim 2, wherein at least one of the first and second assets is an electronic file, and the corresponding security token is configured to restrict access to the corresponding electronic file by deleting content of the electronic file upon determining the dissociation from the corresponding home network.

5. The method of claim 1, wherein the corresponding home network for at least one of the first and second assets is defined based on one or more security policies associated with the corresponding asset.

6. The method of claim 1, wherein the assets associated with the network comprises one or more of: a device connected to the network, a file stored on a storage device connected to the network, and a user-profile associated with the network.

7. The method of claim 1, wherein at least one of the first and second assets is an electronic file, and initiating an integration of the first or second security token with the corresponding asset comprises at least one of: (a) initiating an encapsulation of the first or second security token with the corresponding electronic file to generate an executable file, (b) initiating a code injection to a header portion of the corresponding electronic file, or (c) initiating an encryption of the corresponding electronic file based on the corresponding security token.

8. The method of claim 1, wherein the information includes one or more of: a serial number of a device, a media access control (MAC) address, a file path, a registry key, a network identifier, an internet protocol (IP) address, a file-type identifier, a user-profile identifier, and one or more policies associated with the network.

9. The method of claim 1, wherein the information about the one or more assets is received from an agent deployed on the network, the agent being configured to scan the devices of the network to obtain the information.

10. The method of claim 1, wherein the security token comprises an object generated in accordance with Component Object Model (COM).

11. The method of claim 1, wherein at least one of the first and second assets is an electronic document, and the corresponding security token is integrated into the document as a portion of a page description language of the document.

12. The method of claim 1, wherein restricting access to the first or second asset comprises:
receiving, from the corresponding asset, information related to an access point attempting to access the asset;
determining, based on the stored information about the corresponding security token, whether the access point is outside the corresponding home network; and
providing permission information indicating a level of access permitted for the access point based on the determination.

13. A system comprising:
memory; and
a server comprising one or more processing devices, the server configured to:
receive information about multiple assets associated with a network of devices,
generate, a first asset of the multiple assets, a first security token that is based at least on a portion of the received information about the first asset, wherein the first security token is configured to identify a first home network defined for the first asset, the first home network being specific to the first asset and being defined by a first selection of other assets,
generate, for a second asset of the multiple assets, a second security token that is based at least on a portion of the received information about the second asset, wherein the second security token is configured to identify a second home network defined for the second asset, the second home network being specific to the second asset and being defined by a second selection of other assets, store, in a storage device communicably coupled with the server, information about the first and second security tokens and information linking the first and second security tokens to the corresponding assets, initiate integration of the first and second security tokens with the corresponding assets, and restrict access to the first or second asset upon detecting an occurrence of an unauthorized activity involving the corresponding asset, wherein the server is communicably coupled to the first home network and the second home network, and is configured to detect the occurrence of the unauthorized activity based on information received from the corresponding security token.

14. The system of claim 13, wherein detecting the occurrence of the unauthorized activity comprises determining a dissociation of the first or second asset from the corresponding home network defined for the asset.

15. The system of claim 14, wherein determining the dissociation of the first or second asset from the corresponding home network comprises at least one of: (a) determining that the corresponding asset is not connected to the corresponding home network, (b) determining that the corresponding asset is not stored on a device associated with the corresponding home network, or (c) detecting an access attempt from a user-profile not associated with the corresponding home network.

16. The system of claim 14, wherein at least one of the first and second assets is an electronic file, and the corresponding security token is configured to restrict access to the corresponding electronic file by deleting content of the electronic file upon determining the dissociation from the corresponding home network.

17. The system of claim 13, wherein the corresponding home network for at least one of the first and second assets is defined based on one or more security policies associated with the corresponding asset.

18. The system of claim 13, wherein the assets associated with the network comprises one or more of: a device connected to the network, a file stored on a storage device connected to the network, and a user-profile associated with the network.

19. The system of claim 13, wherein at least one of the first and second assets is an electronic file, and initiating an integration of the first or second security token with the corresponding asset comprises at least one of: (a) initiating an encapsulation of the first or second security token with the corresponding electronic file to generate an executable file, (b) initiating a code injection to a header portion of the corresponding electronic file, or (c) initiating an encryption of the corresponding electronic file based on the corresponding security token.

20. The system of claim 13, wherein the information includes one or more of: a serial number of a device, a media access control (MAC) address, a file path, a registry key, a network identifier, an internet protocol (IP) address, a file-type identifier, a user-profile identifier, and one or more policies associated with the network.

21. The system of claim 13, wherein the information about the one or more assets is received from an agent deployed on the network, the agent being configured to scan the devices of the network to obtain the information.

22. The system of claim 13, wherein the security token comprises an object generated in accordance with Component Object Model (COM).

23. The system of claim 13, wherein at least one of the first and second assets is an electronic document, and the corresponding security token is integrated into the document as a portion of a page description language of the document.

24. The system of claim 13, wherein to restrict access to the first or second asset, the one or more processing devices are configured to:

receive, from the corresponding asset, information related to an access point attempting to access the asset;

determine, based on the stored information about the corresponding security token, whether the access point is outside the corresponding home network; and provide permission information indicating a level of access permitted for the access point based on the determination.

25. One or more machine-readable storage devices storing instructions that are executable by one or more processing devices to perform operations comprising:

receiving information about multiple assets associated with a network of devices;

generating, a first asset of the multiple assets, a first security token that is based at least on a portion of the received information about the first asset, wherein the first security token is configured to identify a first home network defined for the first asset, the first home network being specific to the first asset and being defined by a first selection of other assets;

generating, for a second asset of the multiple assets, a second security token that is based at least on a portion of the received information about the second asset, wherein the second security token is configured to identify a second home network defined for the second asset, the second home network being specific to the second asset and being defined by a second selection of other assets;

storing, in a storage device communicably coupled to the one or more processing devices, information about the first and second security tokens and information linking the first and second security tokens to the corresponding assets;

initiating integration of the first and second security tokens with the corresponding assets; and restricting access to the first or second asset upon detecting an occurrence of an unauthorized activity involving the corresponding asset, wherein the one or more processing devices are communicably coupled to the first home network and the second home network, and are configured to detect the occurrence of the unauthorized activity based on information received from the corresponding security token.

26. The one or more machine-readable storage devices of claim 25, wherein detecting the occurrence of the unauthorized activity comprises determining a dissociation of the first or second asset from the corresponding home network defined for the asset.

27. The one or more machine-readable storage devices of claim 26, wherein determining the dissociation of the first or second asset from the corresponding home network comprises at least one of: (a) determining that the corresponding asset is not connected to the corresponding home network, (b) determining that the corresponding asset is not stored on a device associated with the corresponding home network, or (c) detecting an access attempt from a user-profile not associated with the corresponding home network.

28. The one or more machine-readable storage devices of claim 26, wherein at least one of the first and second assets is an electronic file, and the corresponding security token is configured to restrict access to the corresponding electronic file by deleting content of the electronic file upon determining the dissociation from the corresponding home network.

29. The one or more machine-readable storage devices of claim 25, wherein at least one of the first and second assets is an electronic file, and initiating an integration of the first or second security token with the corresponding asset comprises at least one of: (a) initiating an encapsulation of the first or second security token with the corresponding electronic file to generate an executable file, (b) initiating a code injection to a header portion of the corresponding electronic file, or (c) initiating an encryption of the corresponding electronic file based on the corresponding security token.

30. The one or more machine-readable storage devices of claim 25, wherein restricting access to the first or second asset comprises:

receiving, from the corresponding asset, information related to an access point attempting to access the asset;

determining, based on the stored information about the corresponding security token, whether the access point is outside the corresponding home network; and providing permission information indicating a level of access permitted for the access point based on the determination.

\* \* \* \* \*